(12) United States Patent
Tabassi

(10) Patent No.: US 11,766,817 B2
(45) Date of Patent: Sep. 26, 2023

(54) VALVE PIN PLATE INJECTION MOLDING APPARATUS

(71) Applicant: MOLD-MASTERS (2007) LIMITED, Georgetown (CA)

(72) Inventor: Payman Tabassi, Rockwood (CA)

(73) Assignee: Mold-Masters (2007) Limited, Georgetown (CA)

( * ) Notice: Subject to any disclaimer, the term of this patent is extended or adjusted under 35 U.S.C. 154(b) by 0 days.

(21) Appl. No.: 17/510,662

(22) Filed: Oct. 26, 2021

(65) Prior Publication Data

US 2022/0126492 A1 Apr. 28, 2022

Related U.S. Application Data

(60) Provisional application No. 63/106,112, filed on Oct. 27, 2020.

(51) Int. Cl.
| | |
|---|---|
| *B29C 45/16* | (2006.01) |
| *B29C 45/18* | (2006.01) |
| *B29C 45/20* | (2006.01) |
| *B29C 45/28* | (2006.01) |
| *B29C 45/30* | (2006.01) |
| *B29C 45/27* | (2006.01) |

(52) U.S. Cl.
CPC .......... *B29C 45/1603* (2013.01); *B29C 45/18* (2013.01); *B29C 45/20* (2013.01); *B29C 45/2806* (2013.01); *B29C 45/30* (2013.01); *B29C 2045/274* (2013.01); *B29C 2045/2722* (2013.01); *B29C 2945/7604* (2013.01); *B29C 2945/76274* (2013.01)

(58) Field of Classification Search
CPC ..... B29C 45/18; B29C 45/1603; B29C 45/20; B29C 45/2806; B29C 45/30; B29C 2045/2722; B29C 2045/274; B29C 2945/7604; B29C 2945/76274
See application file for complete search history.

(56) References Cited

U.S. PATENT DOCUMENTS

| | | | | |
|---|---|---|---|---|
| 5,078,589 | A * | 1/1992 | Osuna-Diaz | B29C 45/281 |
| | | | | 425/588 |
| 6,045,740 | A * | 4/2000 | Gorlich | B29C 45/021 |
| | | | | 425/572 |
| 6,056,535 | A * | 5/2000 | Shimizu | B29C 45/572 |
| | | | | 425/572 |
| 7,131,834 | B2 | 11/2006 | Babin et al. | |
| 7,210,922 | B1 | 5/2007 | Kohler | |
| 7,416,402 | B2 * | 8/2008 | Babin | B29C 45/2701 |
| | | | | 425/562 |

(Continued)

FOREIGN PATENT DOCUMENTS

| | | |
|---|---|---|
| DE | 102015216059 A1 | 12/2015 |
| KR | 20050044053 A | 5/2005 |

(Continued)

*Primary Examiner* — Emmanuel S Luk

(74) *Attorney, Agent, or Firm* — Dinsmore & Shohl LLP

(57) ABSTRACT

An injection molding apparatus having a valve pin plate coupling at least one valve pin to an actuator which, in operation, axially moves the valve pin plate between a closed position and an open position. The valve pin is coupled to the valve pin plate via a valve pin coupler. A biasing member is compressed against a support surface by the valve pin holder when the valve pin plate is in the closed position to create a supplementary coupling force coupling the valve pin to the valve pin holder.

12 Claims, 9 Drawing Sheets

(56) References Cited

U.S. PATENT DOCUMENTS

| | | | |
|---|---|---|---|
| 7,470,122 B2* | 12/2008 | Colonico | B29C 45/2806 |
| | | | 425/566 |
| 7,517,214 B2* | 4/2009 | Olaru | B29C 45/2806 |
| | | | 425/566 |
| 7,722,351 B2 | 5/2010 | Feick et al. | |
| 7,963,762 B2 | 6/2011 | Tabassi et al. | |
| 8,100,689 B2 | 1/2012 | Bouti et al. | |
| 8,282,870 B2 | 10/2012 | Bouti et al. | |
| 8,308,476 B2 | 11/2012 | Tabassi et al. | |
| 8,985,997 B2* | 3/2015 | Klobucar | B29C 45/281 |
| | | | 425/562 |
| 9,358,713 B2 | 6/2016 | Olaru | |
| 10,882,233 B2* | 1/2021 | Ferenc | B29C 45/281 |
| 11,148,337 B2* | 10/2021 | Eimeke | B29C 45/1775 |
| 11,396,118 B2* | 7/2022 | Sredzinski | B29C 45/281 |
| 2004/0185135 A1* | 9/2004 | Colonico | B29C 45/2701 |
| | | | 425/546 |
| 2004/0185142 A1* | 9/2004 | Olaru | B29C 45/1603 |
| | | | 425/170 |
| 2005/0226956 A1* | 10/2005 | Fischer | B29C 45/2738 |
| | | | 425/549 |
| 2008/0292746 A1* | 11/2008 | Olaru | B22D 17/2038 |
| | | | 425/549 |
| 2009/0148551 A1* | 6/2009 | Feick | B29C 45/281 |
| | | | 425/564 |
| 2010/0044896 A1* | 2/2010 | Tabassi | B29C 45/2896 |
| | | | 425/145 |
| 2010/0047383 A1* | 2/2010 | Tabassi | B29C 45/2896 |
| | | | 251/89 |
| 2010/0092588 A1* | 4/2010 | Tabassi | B29C 45/281 |
| | | | 425/3 |
| 2010/0124579 A1* | 5/2010 | Tabassi | B29C 45/281 |
| | | | 425/562 |
| 2011/0304075 A1 | 12/2011 | Catoen et al. | |
| 2012/0225148 A1* | 9/2012 | Tabassi | B29C 45/281 |
| | | | 425/3 |
| 2015/0014887 A1* | 1/2015 | Keitel | B29C 45/2725 |
| | | | 264/328.8 |
| 2019/0366611 A1 | 12/2019 | Eimeke et al. | |

FOREIGN PATENT DOCUMENTS

| | | |
|---|---|---|
| KR | 100514235 B1 | 9/2005 |
| KR | 100655750 B2 | 12/2006 |

* cited by examiner

VALVE PIN PLATE INJECTION MOLDING APPARATUS

RELATED APPLICATION

This application claims the benefit of prior Application No. 63/106,112, filed Oct. 27, 2020, which is incorporated by reference herein in its entirety.

FIELD

The present application relates to valve pin plate injection molding and, in particular, to a valve pin plate having a plurality of valve pins releasably coupled thereto by respective valve pin holders.

BACKGROUND

A valve pin plate is used to simultaneously move a plurality of valve pins, each associated with a respective mold cavity, between an open position and a closed position. A valve pin plate is typically used to achieve closer pitch spacing between adjacent mold cavities in a high cavity mold than would be possible if each mold cavity was gated by a valve pin coupled to a respective actuator. A challenge associated with valve pin plates is ceasing opening and closing movement of an affected valve pin if, for example, its associated mold cavity becomes damaged or otherwise non-operational. To address this challenge, hot runner manufacturers have created valve pin holders which decouple a valve pin from the valve pin plate when a decoupling force acting on the valve pin exceeds a coupling force (for example, friction force, lateral force, magnetic force inter alia) holding the valve pin to the valve pin plate. While a theoretical coupling force of a valve pin holder can be calculated, factors such as manufacturing tolerance build-up, material discrepancies, assembly error, and wear, can cause the actual coupling force of a valve pin holder to be less than its theoretical coupling force. In addition, decoupling force acting on the valve pin holder can vary depending on various parameters including molding material viscosity and actuator velocity and tool design. In some instances, actual coupling force and actual decoupling force can vary between different locations in a mold. Given the uncertainty of actual coupling force and actual decoupling force, instances arise in which a valve pin holder will decouple a valve pin of an operational mold cavity.

SUMMARY

Embodiments hereof are directed towards an injection molding apparatus including a manifold having a manifold channel extending between a manifold inlet and a manifold outlet, a nozzle having a nozzle channel extending therethrough and in fluid communication with the manifold channel via the manifold outlet, and a valve pin plate coupled to an actuator which, in operation, axially moves the valve pin plate between a closed position and an open position. A mold plate is spaced apart from the manifold and is disposed between the manifold and the valve pin plate. The mold plate includes a valve pin passageway through which a valve pin extends. The valve pin is releasably coupled to the valve pin to the valve pin plate by a valve pin holder and a biasing member compressed by the valve pin holder against a support surface when the valve pin plate is in the closed position.

An aspect of the present application provides an injection molding apparatus comprising a manifold having a manifold channel extending between a manifold inlet and a manifold outlet; a nozzle having a nozzle channel extending therethrough, the nozzle channel in fluid communication with the manifold channel via the manifold outlet; a valve pin plate coupled to an actuator which, in operation, axially moves the valve pin plate between a closed position and an open position; a mold plate spaced apart from the manifold and disposed between the manifold and the valve pin plate, the mold plate having a valve pin passageway extending therethrough; a valve pin extending through the valve pin passageway; a valve pin holder releasably coupling the valve pin to the valve pin plate; and a biasing member being compressed against a support surface by the valve pin holder when the valve pin plate is in the closed position.

The biasing member can be compressed by the valve pin holder when the valve pin plate is in the open position.

The biasing member can be compressed against the mold plate when the valve pin plate is in the closed position.

The valve pin can extend through the biasing member.

The mold plate can include a counterbore defining a step in valve pin passageway against which the biasing member is seated.

The injection molding apparatus can further comprise a spacer, wherein the mold plate is spaced apart from the manifold by the spacer, and the biasing member is compressed against the spacer when the valve pin plate is in the closed position.

The injection molding apparatus can further comprise a sleeve through which the valve pin extends, the sleeve surrounding the valve pin and forming a circumferential barrier between the valve pin and the biasing member.

A downstream end of the sleeve can include a flange, the biasing member is compressed against the flange when the actuator is in the closed position.

The injection molding apparatus can further comprise a wiper secured within the valve pin passageway between the biasing member and the manifold, the valve pin extending through and slidably engaged with the wiper.

The injection molding apparatus can further comprise: an another mold plate, the valve pin plate being disposed between the mold plate and the another mold plate; and an another biasing member compressed against the another mold plate when the valve pin plate is in the open position.

The another mold plate can include a pocket defining a seat against which the another biasing member is compressed when the valve pin plate is in the open position.

The valve pin holder can include a first coupling component attached to the valve pin plate and a second coupling component secured to the valve pin and releasably coupled to the first coupling component.

The second coupling component can be releasably coupled to the first coupling component by one of a friction force and a magnetic force.

The biasing member can be a helical spring.

BRIEF DESCRIPTION OF DRAWINGS

The drawings are not to scale.

DETAILED DESCRIPTION

Specific embodiments of the present application are now described with reference to the figures. The following detailed description is merely exemplary in nature and is not intended to limit the scope of the application. In the following description, "downstream" is used with reference to the direction of molding material flow from an injection unit of an injection molding machine to a mold cavity of a mold of an injection molding apparatus, and also with reference to the order of components or features thereof through which the molding material flows from the injection unit to the mold cavity, whereas "upstream" is used with reference to the opposite direction. In the following description, a reference number followed by the letter "s" indicates a schematic representation of a component or feature thereof associated with the reference number. Furthermore, there is no intention to be bound by any expressed or implied theory presented in the preceding field, background, summary or the following detailed description.

Figure 1:
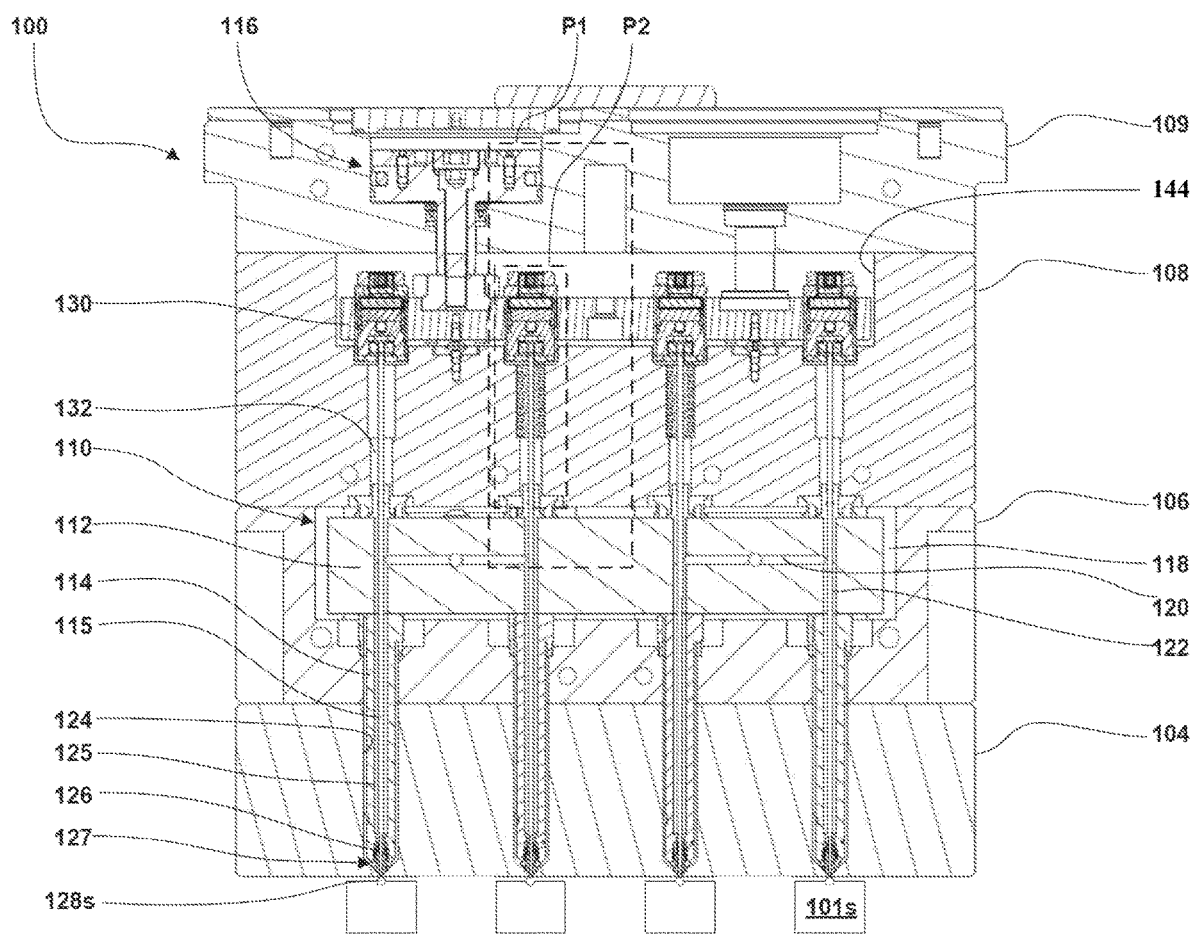
FIG. 1 is a sectional view of an injection molding apparatus in accordance with an embodiment of the present application.

FIG. 1 is a sectional view of an injection molding apparatus 100 in accordance with an embodiment of the present application. Injection molding apparatus 100 delivers molding material received from a source (not shown) to a plurality of mold cavities 101s. Injection molding apparatus 100 includes a plurality of mold plates, for example a first mold plate 104, a second mold plate 106, a third mold plate 108, and a fourth mold plate 109 within and between which a hot runner system 110 is received. As is commonly known, mold plates 104, 106, 108, 109 are held together by fasteners (not shown), and may also include additional fastening and/or aligning components such as guide pins, guide bushings etc. as would be understood by one of ordinary skill in the art. While four mold plates 104, 106, 108, 109 are shown, injection molding apparatus 100 can include other than four mold plates.

Injection molding apparatus 100 includes hot runner system 110 which distributes an incoming stream of a molding material (not shown) to mold cavities 101s. Hot runner system 110 includes a manifold 112, a plurality of nozzles 114, each having a respective heater, and a plurality of valve pins 115 which are translated by an actuator 116 between an open position and a closed position to control the flow of molding material into mold cavities 101s. For the sake of brevity, valve pins 115 and nozzles 114 often referred to in singular form. Manifold 112 divides the incoming melt stream into a plurality of outgoing melt streams, each of which is delivered to a respective mold cavity 101s via a respective nozzle 114. Manifold 112 is received in an enclosure 118 defined by second and third mold plates 106, 108, and is spaced apart from second and third mold plates 106, 108 to form an insulating air gap therebetween. Manifold 112 includes a manifold channel 120 that extends between a manifold inlet (not visible in the sectional view of FIG. 1) and a manifold outlet 122. Nozzle 114 is received in a nozzle well 124 which extends downstream from enclosure 118. Nozzle 114 includes a nozzle channel 125 extending therethrough. Nozzle channel 125 is in fluid communication with manifold channel 120 via manifold outlet 122. At its downstream end, nozzle channel 125 is in fluid communication with a tip channel 126 of a nozzle tip 127 which delivers molding material to mold cavity 101s via a mold gate 128s.

Valve pin 115 is coupled to a valve pin plate 130 which is coupled to actuator 116. Actuator 116 moves between a closed configuration (see FIGS. 1 and 2) and an open configuration (see FIG. 3). Valve pin plate 130 is located between third mold plate 108 and fourth mold plate 109. Valve pin plate 130 is separated from manifold 110 by third mold plate 108, which includes a valve pin passageway 132 through which valve pin 115 extends. Downstream from third mold plate 108, valve pin 114 extends through manifold 110 and nozzle 114 towards mold gate 128s.

In operation, as actuator 116 moves between the closed configuration and the open configuration, valve pin plate 130 moves therewith, and valve pins 115, which are coupled to valve pin plate 130 move synchronously together with valve pin plate 130. When actuator 116 is in the open configuration valve pins 115 are in the open position, separated from mold gate 128s, to permit molding material to pass through mold gates 128s and into mold cavities 101s. Conversely, when actuator 116 is in the closed configuration, valve pins 115 are in the closed position, blocking mold gates 128s, to prevent molding material from entering mold cavity 101s. In FIG. 1, actuator 116 is in the closed configuration, and valve pin plate 130 and valve pins 115 are in the closed position. As shown, actuator 116 is as a two-position, fluid driven actuator. Alternatively (not shown) actuator 116 can be configured to synchronously move valve pin plate 130 and valve pin 115 coupled thereto to one or more positions other than the open position and the closed position. Actuator 116 and fourth mold plate 109 can also be a servo driven actuator, such as an E-drive system available from Mold-Masters of Georgetown Ontario, Canada.

Figure 2:
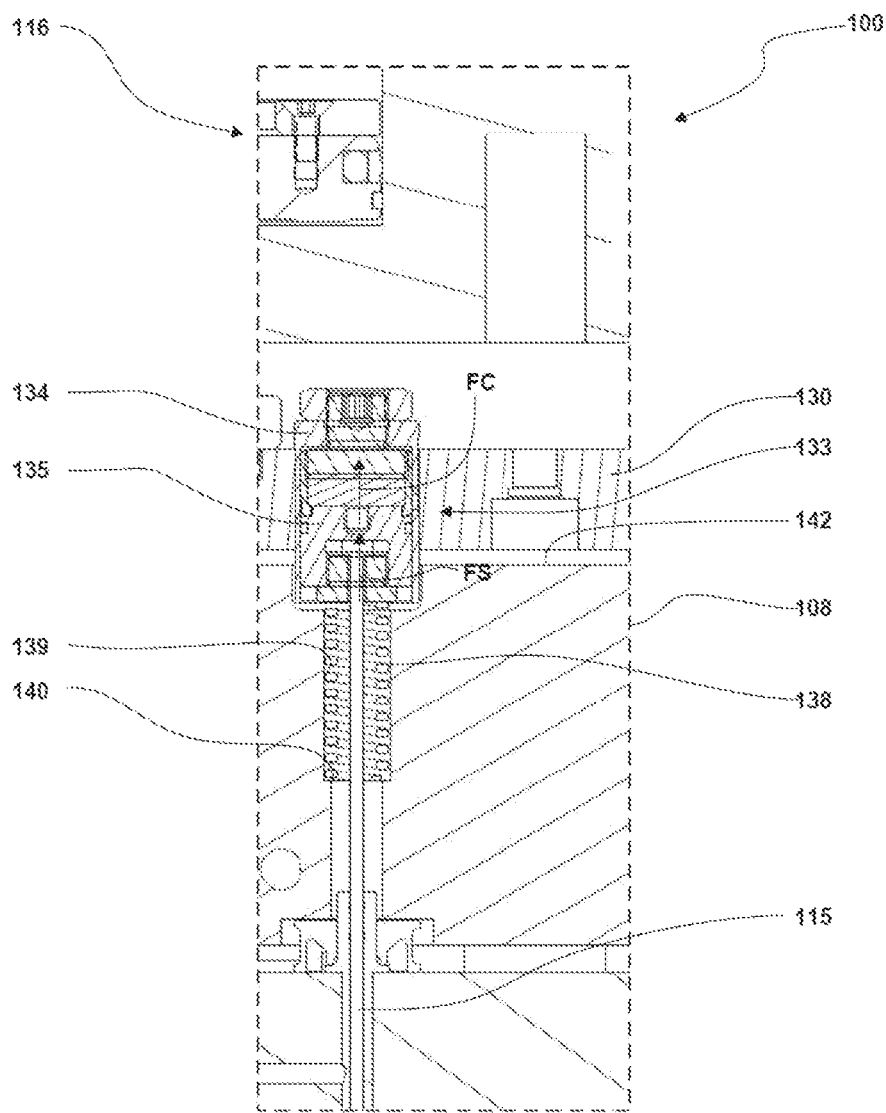
FIG. 2 is an enlarged view of a portion of FIG. 1 showing a valve pin plate in a closed position and an actuator in a closed configuration.
Figure 3:
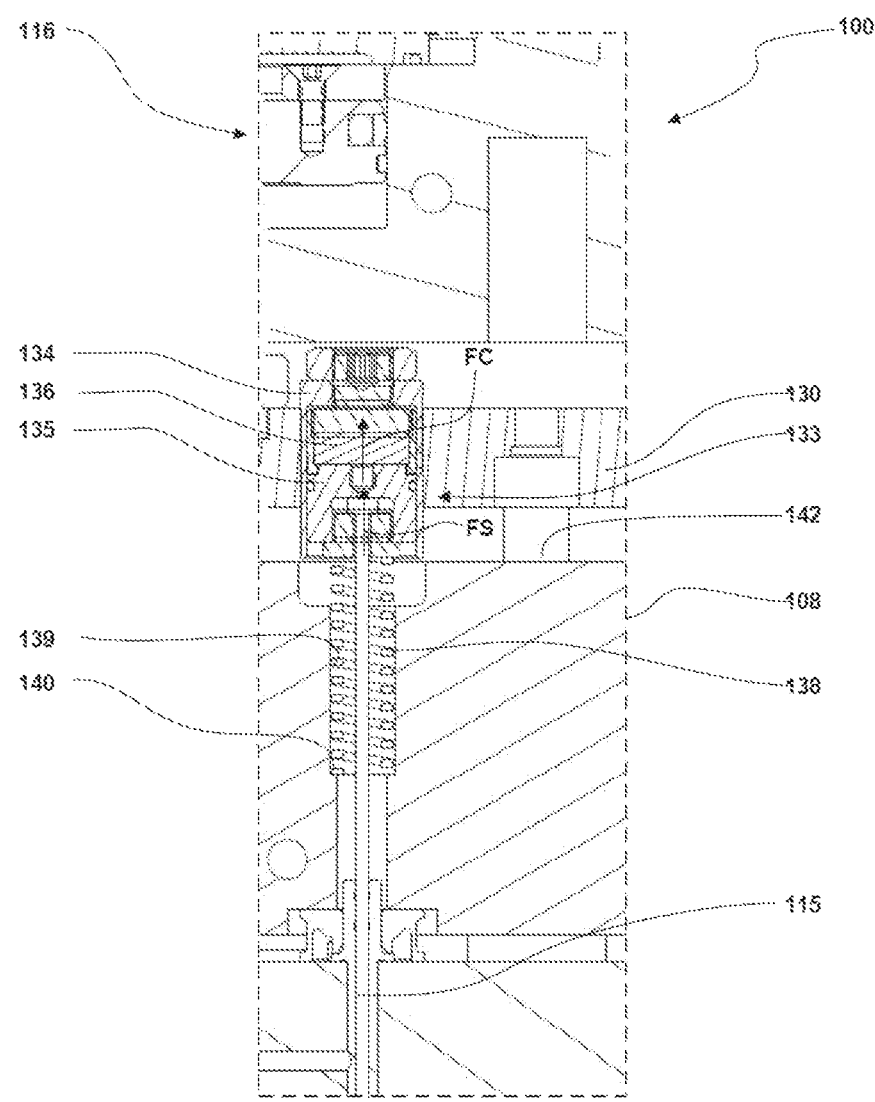
FIG. 3 is the enlarged view of FIG. 2 showing the valve pin plate in an open position and an actuator in an open configuration.

Referring to FIGS. 2, and 3 in which FIG. 2 is an enlarged view of a portion P1 of FIG. 1 with valve pin plate 130 in the closed position and actuator 116 in the closed configuration, and FIG. 3 is an enlarged view of a portion P1 of FIG. 1 with valve pin plate 130 in the open position and actuator 116 in the open configuration. Valve pin 115 is coupled to valve pin plate 130 by a valve pin holder 133. Valve pin holder 133 is configured to permit decoupling of valve pin 115 from synchronous movement with valve pin plate 130 as valve pin plate 130 is moved from the closed position to the open position. In the illustrated embodiment of FIGS. 1-3 valve pin older 133 includes a first coupling component 134 and a second coupling component 135. First coupling component 134 is fixed to valve pin plate 130, by, for example complementary threads, and second coupling component 135 is coupled to valve pin 115 and releasably coupled to first coupling component 134 by a coupling force FC.

Figure 4:
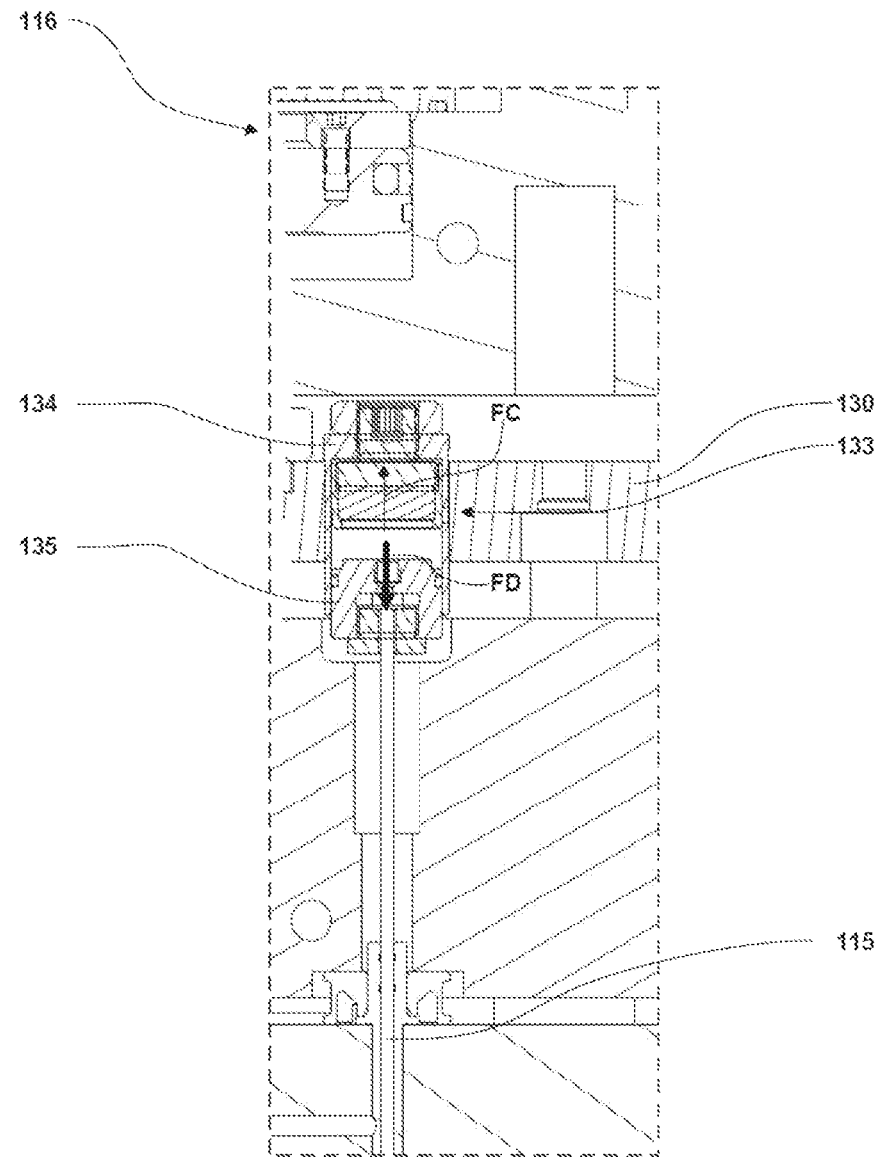
FIG. 4 is an enlarged view of portion of FIG. 1 showing the valve pin plate in an open position, the actuator in the open configuration, and a valve pin holder in a decoupled configuration.

In the illustrated embodiment of FIGS. 1-3, coupling force FC is a magnetic force which is realized by first coupling component 134 including a magnet 136 or being magnetic, and second coupling component 135 being made from or including a ferrous material magnetically attracted to first coupling component 134. In operation, as valve pin plate 130 is moved from the open position to the closed position, first coupling component 134 pushes against second coupling component 135 to move valve pin 115 to the closed position. Conversely, as valve pin plate 130 is moved from the closed position to the open position, attractive magnetic force, coupling force FC pulls second coupling component 135 with first coupling component 134 so as to move second coupling component 135 and valve pin 115 coupled thereto to the open position. In accordance with embodiments hereof, injection molding apparatus includes a biasing member 138 which provides supplemental coupling force FS to valve pin holder 130 as will be discussed in further detail below Referring to FIG. 4 which is an enlarged view of portion P1 of FIG. 1 shown without biasing member 138. In FIG. 4, valve pin 115 is in the open position, actuator 116 in the open configuration, and valve pin holder 133 in a decoupled configuration in which second coupling component 135 is separated from first coupling component 134. As valve pin plate 130 is moved from the closed position to the open position, and valve pin 115 experiences a decoupling force FD which is greater than the coupling force FC second coupling component 135 decouples from first coupling component 134. If decoupling occurs immediately upon actuator 116 moving from the closed configuration to the open configuration, valve pin 115 may remain in the closed position, preventing molding material from entering mold cavity 101s thus rendering mold cavity 101s non-operational, i.e., not producing functional molded articles. If decoupling occurs as valve pin plate 130 moves from the closed position to the open position, valve pin 115 may remain in an intermediate position, between the closed and the open position, possibly obstructing molding material from entering mold cavity 101s and rendering mold cavity 101s non-operational. Decoupling force FD can be generated by a number of factors, including, for example friction or seizing between valve pin 115 and another hot runner component with which valve pin 115 is slidably engaged, friction between valve pin 115 and molding material in nozzle channel 125, and rapid actuator velocity as valve pin plate 130 is moved to the open position.

Returning to FIGS. 2 and 3 and referring to FIG. 1, if it is determined that injection molding apparatus 100 is functional, i.e. capable of producing molded articles except for valve pin 115 decoupling from valve pin plate 130, biasing member 138 is installed against valve pin holder 133 to supplement the coupling force FC between first coupling component 134 and second coupling component 135 by urging second coupling component 135 against first coupling component 135 at least when valve pin plate 130 is in the closed position. With biasing member 138 installed in injection molding apparatus 100 and compressed by valve pin holder 133, as valve pin plate 130 is moved from the closed position to the open position, biasing member 138 expands and bears against second coupling component 135, which adds supplemental coupling force SF to the coupling force FC between first and second coupling components 134,135. Supplemental coupling force SF increases the decoupling force FD required to decouple valve pin 115 from valve pin plate 130. Biasing member 138 is most compressed when valve pin plate 130 is in the closed position. In some applications in which supplemental coupling force SF is needed throughout the full travel distance of valve pin plate 130, i.e., between the closed position and the open position, biasing member 138 is partially compressed by valve pin holder 133 when valve pin plate 130 is in the open position.

In the illustrated embodiment of FIGS. 1-3, valve pin 115 extends through biasing member 138. Alternatively, (not shown), biasing member includes a plurality of biasing members arranged in parallel and evenly spaced around valve pin 115.

In the illustrated embodiment of FIGS. 1-3, third mold plate 108 includes a counterbore 139 in which biasing member 138 is received. Counterbore 139 defines a step 140 against which biasing member 138 is compressed. Counterbore 139 and step 140 reduce the stack height of injection molding apparatus 100 compared to an embodiment of injection molding apparatus (not shown) in which counterbore 139 is omitted and biasing member 138 is compressed against a bottom 142 of a pocket 144 (see FIG. 1) in which valve pin plate 130 is received. Counterbore 139 also allows injection molding apparatus 100 to be provided to a user without biasing member 138 installed therein. In this configuration, if, while operating injection molding apparatus 100, if it is determined that it is unnecessary for certain valve pin holders 133 to decouple, biasing member 138 is installed in counterbores 139 associated with the unnecessary decoupling valve pin holders 133 to add supplementary coupling force FS to primary coupling force FC holding first and second coupling components 134, 135 together. If the stack height of injection molding apparatus 100 permits, counterbore 138 can be omitted such that biasing member 138 is compressed against bottom 142 of pocket 144.

Figure 5:
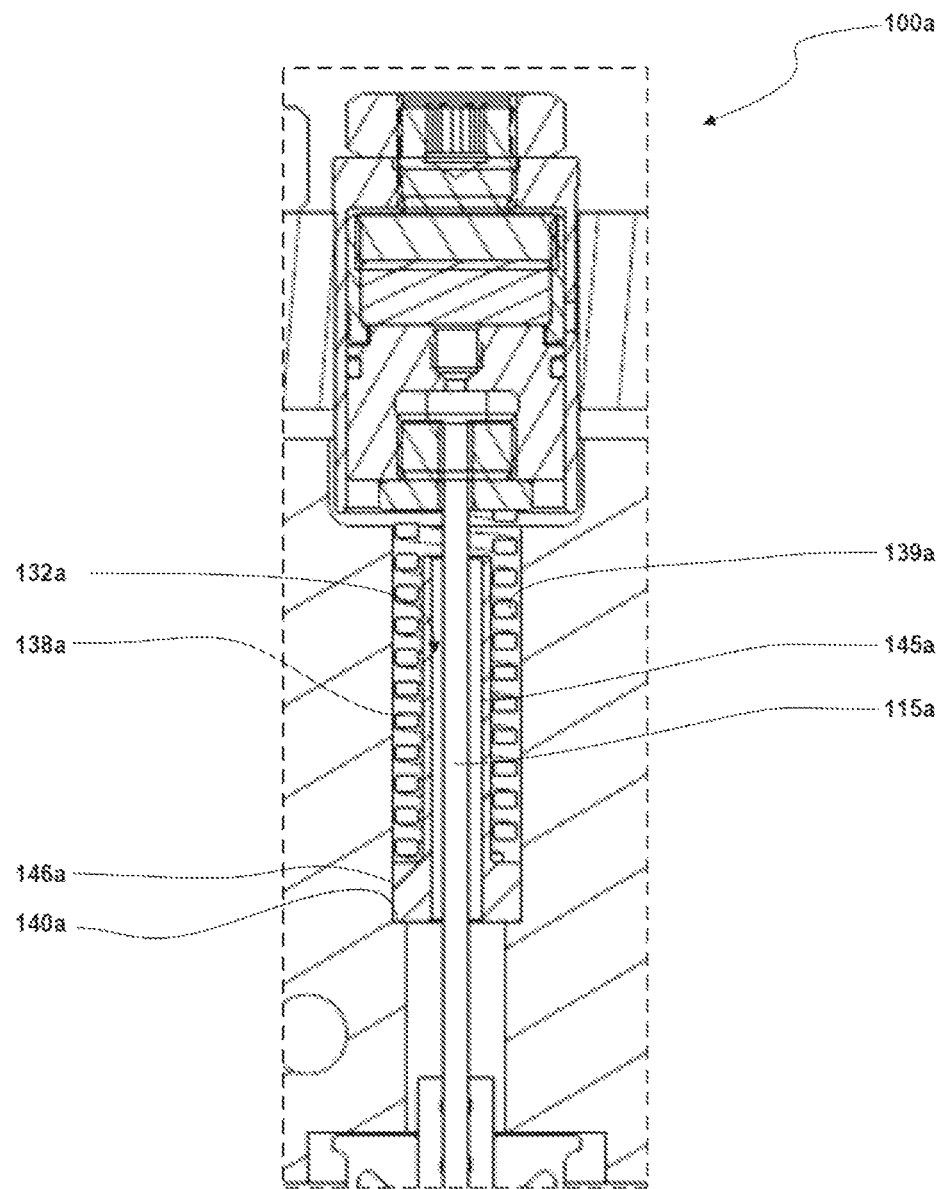
FIG. 5 is an enlarged view of a portion of an injection molding apparatus in accordance with another embodiment of the present application.

FIG. 5 is an enlarged view of a portion of an injection molding apparatus 100a in accordance with another embodiment of the present application. The portion of injection molding apparatus 100a shown in FIG. 5 is similar to portion P2 of FIG. 1. Features and aspects of the current embodiment can be used with the other embodiments. Injection molding apparatus 100a differs from injection molding apparatus 100 of FIGS. 1 to 3 in that injection molding apparatus 100a includes a sleeve 145a which is received in counterbore 139a. Sleeve 145a surrounds valve pin 115a to form a physical barrier between valve pin 115a and biasing member 138a. A downstream end of sleeve 145a includes a flange 146a which is seats against step 140a. Biasing member 138a is compressed against flange 146a to secure sleeve 145a within valve pin passageway 132a. In the event that molding material or molding material byproducts egress hot runner system 110a into valve pin passageway 132a, sleeve 145a prevents or reduces the likelihood of biasing member 138a becoming compacted with the egressed molding material or molding material byproducts and failing to functionally compress. In the illustrated embodiment of FIG. 5, sleeve 145a and biasing member 138a are closely sized to help center biasing member 138a within counterbore 139a, and to limit or prevent biasing member 138a from buckling as biasing member 138a is compressed.

Figure 6:
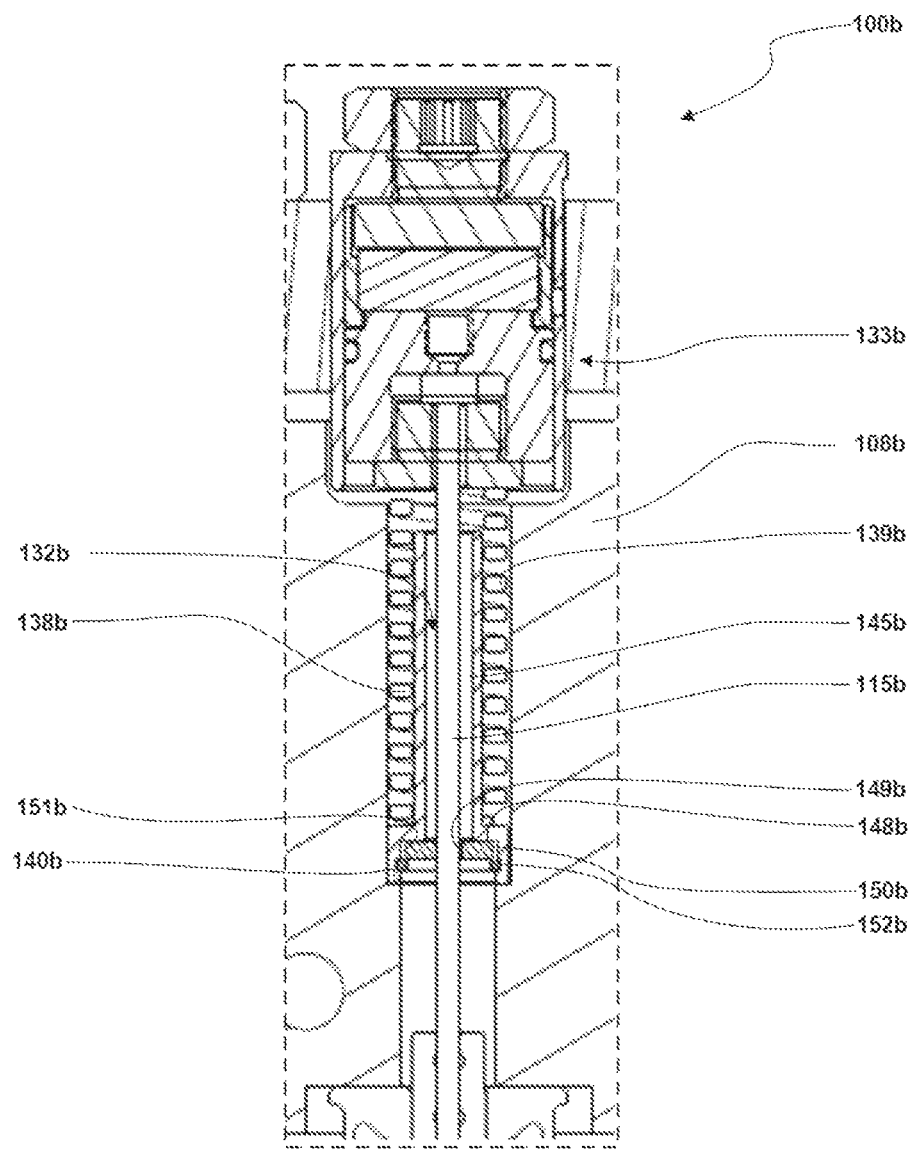
FIG. 6 is an enlarged view of a portion of an injection molding apparatus in accordance with yet another embodiment of the present application.

FIG. 6 is an enlarged view of a portion of an injection molding apparatus 100b in accordance with another embodiment of the present application. The portion of injection molding apparatus 100b shown in FIG. 6 is similar to portion P2 of FIG. 1. Features and aspects of the current embodiment can be used with the other embodiments.

Injection molding apparatus 100b differs from injection molding apparatus 100a of FIG. 5 in that injection molding apparatus 100b includes a wiper 148b that is axially secured within valve pin passageway 132b between biasing member 138b and the manifold (not visible in FIG. 6). Wiper 148b is ring shaped and includes an inner bore 149b that is sized to slidably receive valve pin 115b. A peripheral surface 150b of wiper 148b is sized to permit lateral displacement of wiper 148b within valve pin passage 132b, for example, to permit wiper 148b to move laterally with valve pin 115b as manifold (not visible in FIG. 6) is heated to operating temperature. Should molding material or molding material byproducts egress hot runner system 110b and migrate along valve pin 115b towards valve pin holder 133b, wiper 148b separates the egressed material from valve pin 115b as valve pin 115b is retracted from the closed position to the open position. In the illustrated embodiment of FIG. 6, wiper 148b is received in a counterbore 151b in a downstream end of sleeve 145b and is held therein by a retaining clip 152b. Alternatively (not shown) sleeve 145b is omitted wiper 148b is sized to seat against step 140b and is secured in counter bore 139b in third mold plate 108b by, for example, a retaining ring.

Figure 7:
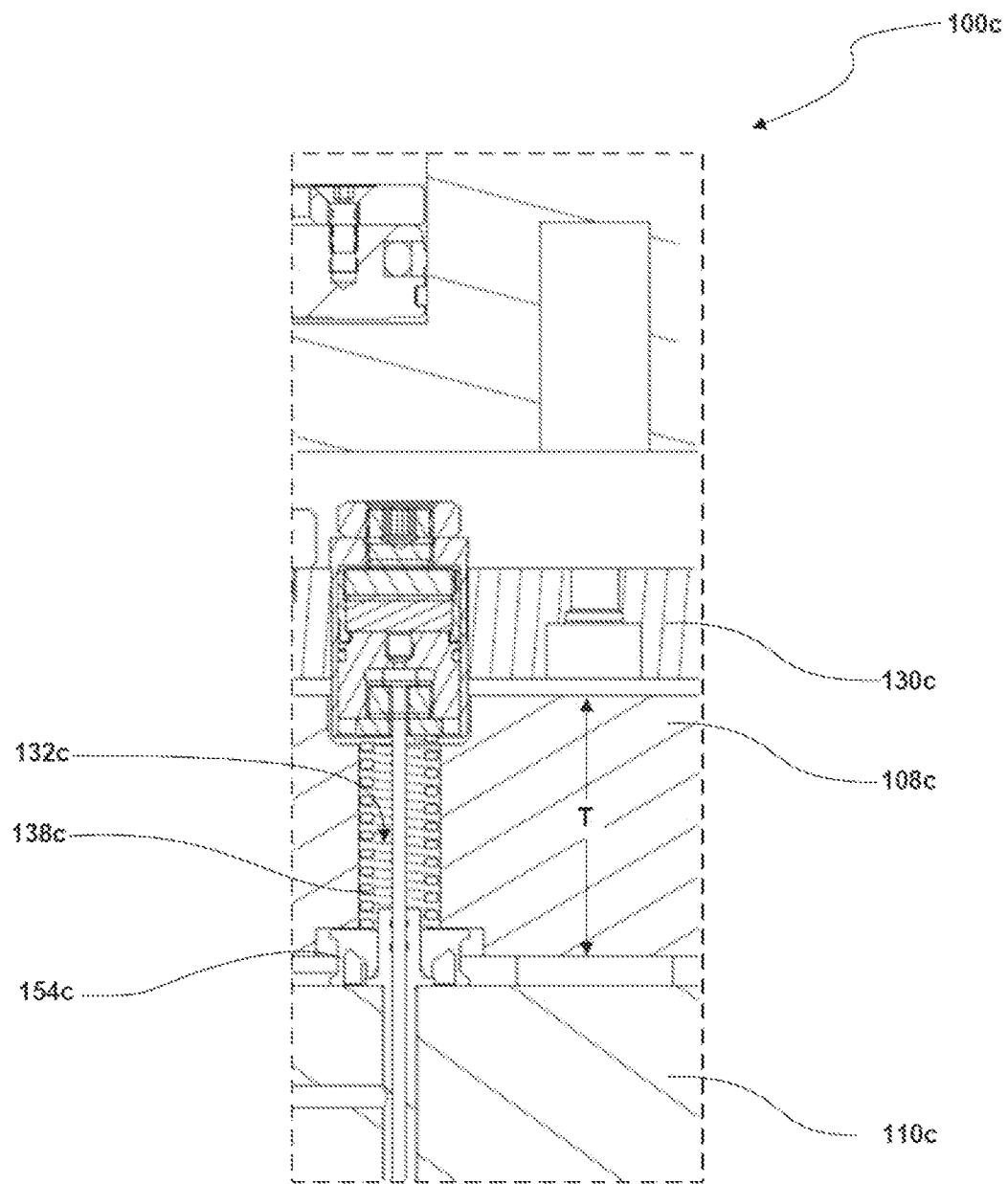
FIG. 7 is an enlarged view of a portion of an injection molding apparatus in accordance with yet another embodiment of the present application.

FIG. 7 is an enlarged view of a portion of an injection molding apparatus 100c in accordance with another embodiment of the present application. The portion of injection molding apparatus 100c shown in FIG. 7 is similar to portion P1 of FIG. 1. Features and aspects of the current embodiment can be used with the other embodiments. Injection molding apparatus 100c differs from injection molding apparatus 100a of FIG. 1 in that valve pin passageway 132c and biasing member 138c are sized so that biasing member 138c extends through valve pin passageway 132c, and is compressed against a spacer 154c that separates third mold plate 108c apart from the manifold 110c. This configuration reduces the thickness T of third mold plate 108c between manifold 110c and valve pin plate 130c.

Figure 8:
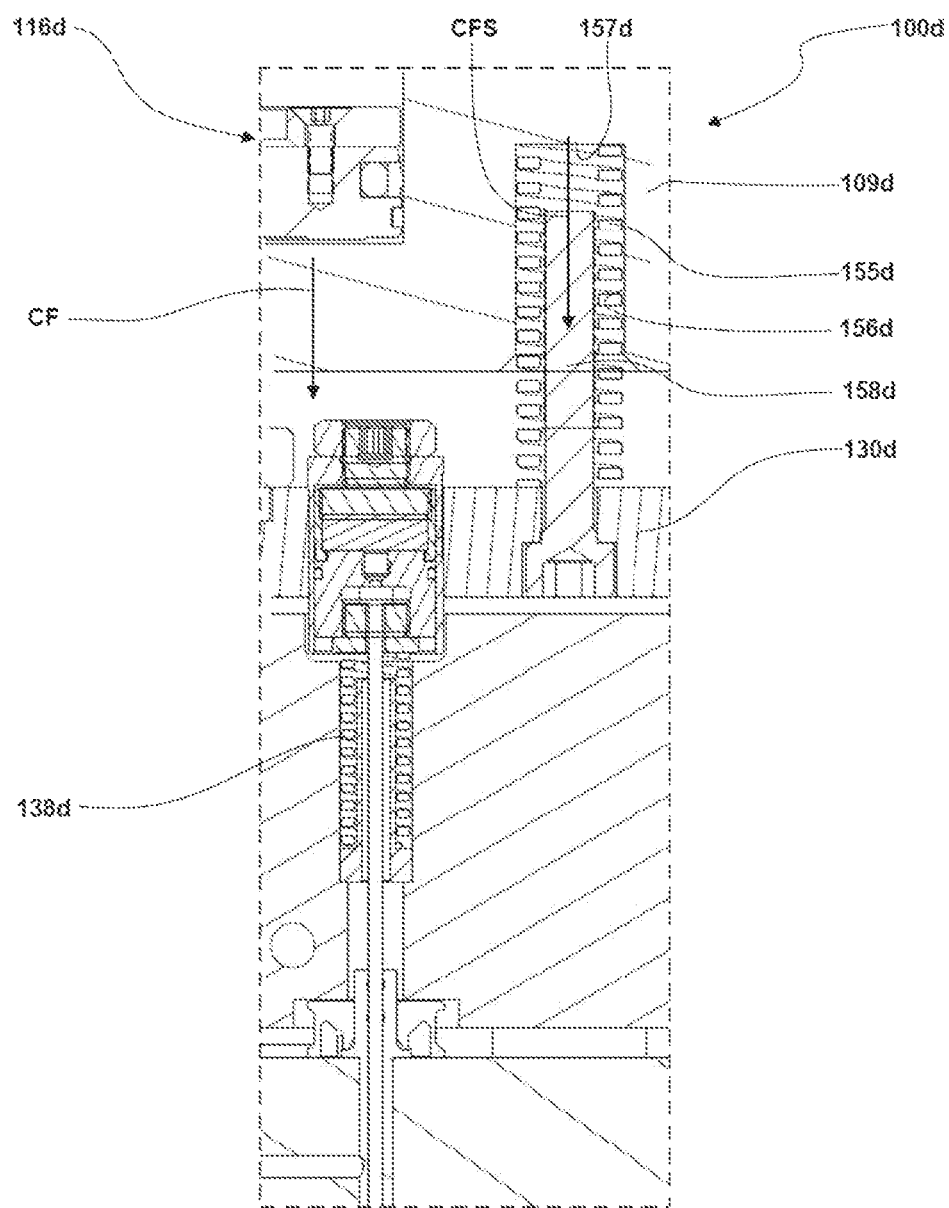
FIG. 8 is an enlarged view of a portion of an injection molding apparatus in accordance with yet another embodiment of the present application showing the valve pin plate in a closed position and an actuator in a closed configuration.
Figure 9:
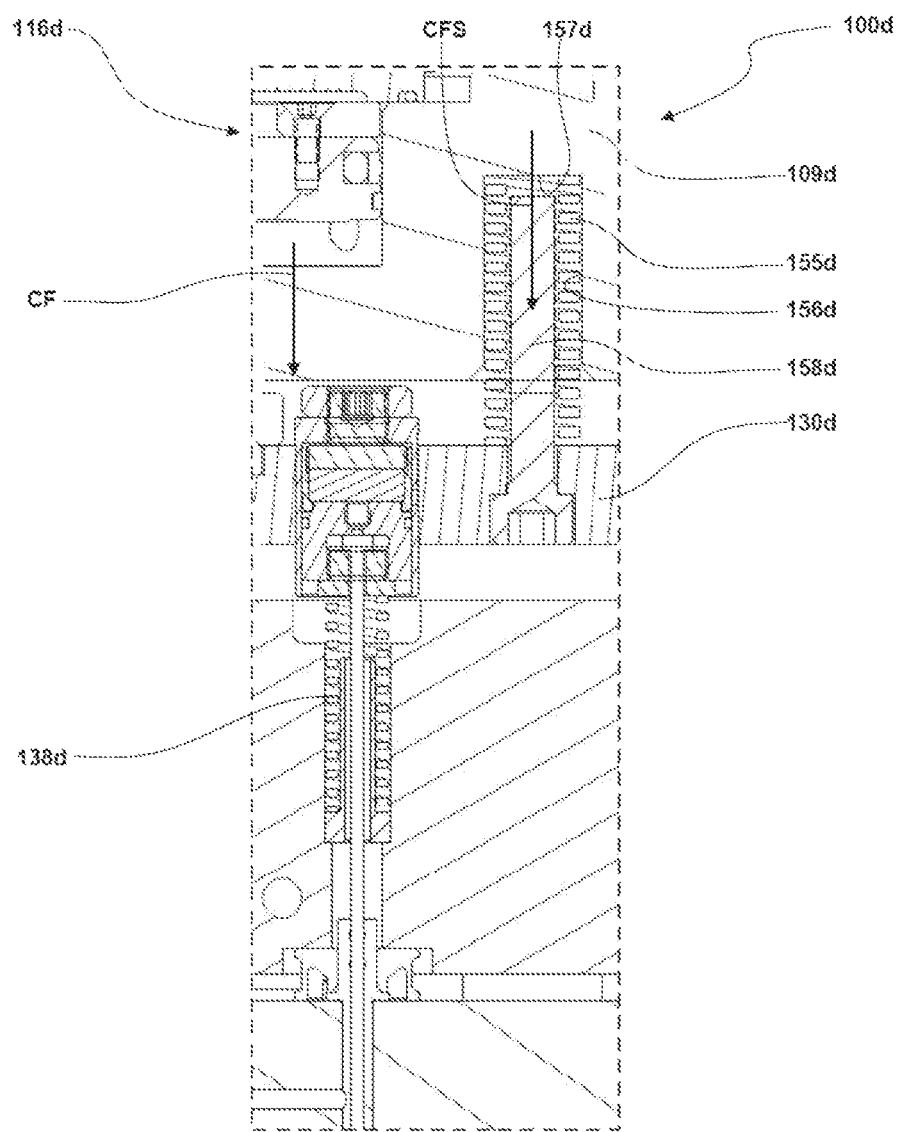
FIG. 9 is an enlarged view of a portion of an injection molding apparatus in accordance with the embodiment of FIG. 8 showing the valve pin plate in an open position and an actuator in an open configuration.

FIGS. 8 and 9 are enlarged views of a portion of an injection molding apparatus 100d in accordance with another embodiment of the present application. In FIG. 8, valve pin plate 130d is in the closed position and actuator 116d is in the closed configuration, and in FIG. 9, valve pin plate 130d is in the open position and actuator 116d is in the open configuration. The portion of injection molding apparatus 100d shown in FIGS. 8 and 9 is similar to portion P1 of FIG. 1. Features and aspects of the current embodiment can be used with the other embodiments. Injection molding apparatus 100c differs from injection molding apparatus 100a of FIG. 1 in that injection molding apparatus includes another biasing member 155d which counters the force created by biasing member 138d Biasing member 155d is located between valve pin plate 130d and fourth mold plate 109d, and is compressed by valve pin plate 130d when valve pin plate 130d is in the open position. Depending on the compression strength of biasing member 155d, Biasing member 155d dampens the opening speed of valve pin plate 130d and/or reduces the actuator closing force CF needed to move valve pin plate 130d to the closed position by supplementing actuator closing force CF with supplementary closing force FCS.

In the illustrated embodiment of FIGS. 8 and 9, biasing member 155d is laterally offset from biasing member 138d, and fourth mold plate 109d includes a pocket 156d which defines a seat 157d against which biasing member 155d is compressed when valve pin plate 130d is in the open position.

Also, in the illustrated embodiment of FIGS. 8 and 9, biasing member 155d is aligned with pocket 156d by a guide pin 158d that extends from valve pin plate 130d. In addition to aligning biasing member 155d, guide pin 158d limits or prevents biasing member 155d from buckling as biasing member 155d is compressed.

As disclosed herein, valve pin holder 133 is configured so that coupling force FC is a magnetic force between first coupling component 134 and second coupling component 135. It should be appreciated that valve pin holder 133 can also be configured so that coupling force FC is a friction force between a first coupling component in the form of a tapered socket a second coupling component in the form of a complementary tapered plug. In this configuration, biasing member 138 is arranged to urge the tapered plug into the tapered socket.

What is claimed is:
1. An injection molding apparatus comprising:
   a manifold having a manifold channel extending between a manifold inlet and a manifold outlet;
   a nozzle having a nozzle channel extending therethrough, the nozzle channel in fluid communication with the manifold channel via the manifold outlet;
   a valve pin plate coupled to an actuator which, in operation, axially moves the valve pin plate between a closed position and an open position;
   a mold plate spaced apart from the manifold and disposed between the manifold and the valve pin plate, the mold plate having a valve pin passageway extending therethrough;
   an another mold plate, the valve pin plate being disposed between the mold plate and the another mold plate;
   a valve pin extending through the valve pin passageway;
   a valve pin holder releasably coupling the valve pin to the valve pin plate;
   a biasing member being compressed against a support surface by the valve pin holder when the valve pin plate is in the closed position; and
   an another biasing member compressed against the another mold plate when the valve pin is in the open position.

2. The injection molding apparatus of claim 1, wherein the biasing member is compressed against the mold plate when the valve pin plate is in the closed position.

3. The injection molding apparatus of claim 2, wherein the valve pin extends through the biasing member.

4. The injection molding apparatus of claim 3, wherein the mold plate includes a counterbore defining a step in valve pin passageway against which the biasing member is seated.

5. The injection molding apparatus of claim 1 further comprising a spacer, wherein the mold plate is spaced apart from the manifold by the spacer, and the biasing member is compressed against the spacer when the valve pin plate is in the closed position.

6. The injection molding apparatus of claim 1 further comprising a sleeve through which the valve pin extends, the sleeve surrounding the valve pin and forming a circumferential barrier between the valve pin and the biasing member.

7. The injection molding apparatus of claim 6, wherein a downstream end of the sleeve includes a flange, the biasing member is compressed against the flange when the actuator is in the closed position.

8. The injection molding apparatus of claim 1 further comprising a wiper secured within the valve pin passageway between the biasing member and the manifold, the valve pin extending through and slidably engaged with the wiper.

9. The injection molding apparatus of claim 1, wherein the another mold plate includes a pocket defining a seat against which the another biasing member is compressed when the valve pin plate is in the open position.

10. The injection molding apparatus of claim 1, wherein the valve pin holder includes a first coupling component attached to the valve pin plate and a second coupling component secured to the valve pin and releasably coupled to the first coupling component.

11. The injection molding apparatus of claim 10, wherein the second coupling component is releasably coupled to the first coupling component by one of a friction force and a magnetic force.

12. The injection molding apparatus of claim 1, wherein, the biasing member is a helical spring.

\* \* \* \* \*